June 7, 1927.

E. E. JACOBS 1,631,487

PROCESS FOR MAKING GLACÉ FRUIT

Filed July 15, 1925

INVENTOR.
Ernest E. Jacobs
BY Dewey, Strong, Townsend & Loften
ATTORNEYS.

June 7, 1927.

E. E. JACOBS 1,631,487

PROCESS FOR MAKING GLACÉ FRUIT

Filed July 15, 1925    2 Sheets-Sheet 2

INVENTOR.
Ernest E. Jacobs.
BY
Dewey, Strong, Townsend & Loftus
ATTORNEYS.

Patented June 7, 1927.

1,631,487

UNITED STATES PATENT OFFICE.

ERNEST ENGLER JACOBS, OF SAN FRANCISCO, CALIFORNIA, ASSIGNOR TO LYONS' CALIFORNIA GLACÉ FRUIT COMPANY, OF SAN FRANCISCO, CALIFORNIA, A CORPORATION OF CALIFORNIA.

PROCESS OF MAKING GLACÉ FRUIT.

Application filed July 15, 1925. Serial No. 43,666.

This invention relates to an improved process and apparatus for cooking and treating fruit in the preparation of glacé fruit therefrom. As is well known, glacé fruit is fruit that has been cooked and so treated as to remove the air and water therefrom and thoroughly saturated with a heavy sugar syrup, whereby the fruit will keep in the open air for a considerable period of time without fermentation or deterioration. It is, of course, of great importance to so treat the fruit that the same retains its original shape, color, and flavor, as far as possible. The process of preparing glacé fruit as now carried out is a long and tedious operation. It is the primary object of my invention to provide a new and improved process and apparatus for treating the fruit in a greatly improved manner with far less labor and expense, in less time, and to produce thereby a product superior in shape, color, flavor, and keeping qualities.

The present method of preparing glacé fruit is substantially as follows: The fruit is first prepared by being washed and blanched, such fruits as pears, pineapples, etc., being also peeled. The blanching is substantially a pre-cooking operation in hot water to make the fruit more tender and more receptive to the treatment which follows. Small quantities (fifteen to twenty pounds) of fruit are placed and allowed to cook and soak in hot syrup in small steam-jacketed open kettles. The fruit is subjected to several (usually four to six) of such cookings successively, the syrup being increased in density at each cooking until sufficient density has been obtained to prevent fermentation of the fruit. This process is long and tedious, taking from ten days to two weeks to complete the same. The fruit is thereafter removed from the kettles and allowed to soak in a heavy syrup to thoroughly saturate the fruit therewith. To establish equilibrium between the light syrup in the fruit and this heavier syrup surrounding the fruit usually requires about thirty days. To thereafter prepare the fruit for packing, the same is removed from the syrup, dipped in hot water to remove the excess syrup, and thereafter dipped in a heavy glazing syrup.

My improved process, as will hereinafter appear, not only completely prepares the fruit for the glazing thereof in a greatly reduced amount of time and with far less expense, but also results in a greatly improved product.

In my improved process, I cook and treat a large quantity of fruit in small containers in a vacuum chamber. Repeated handling of the fruit is thereby rendered unnecessary, the air is "sucked" from the fruit without affecting the fruit juices, and the syrup permeates the fruit by taking the place of the exhausted air. The entire process is ordinarily completed in about eight hours. It will be clear that this treatment not only preserves the true flavor and color of the fruit, but, due to less handling and more equalized cooking, the same also maintains its original shape. The fruit is thereafter permitted to stand in the syrup until equilibrium is established between the syrup within the fruit and the syrup surrounding the fruit. This process ordinarily is completed within twenty-four hours. The fruit is then ready to be dipped in glazing syrup and dried for packing in the usual manner. It is an object of my invention to provide an improved process and apparatus for treating the fruit in this improved manner.

In the accompanying drawings, I have shown one specific embodiment of an apparatus for carrying out my process. It will be understood, however, that the invention can be embodied otherwise, and that the drawings are not to be construed as defining or limiting the scope of the invention, the claims appended to this specification being relied upon for that purpose.

Referring to the figures of the drawing,—

Figure 1:
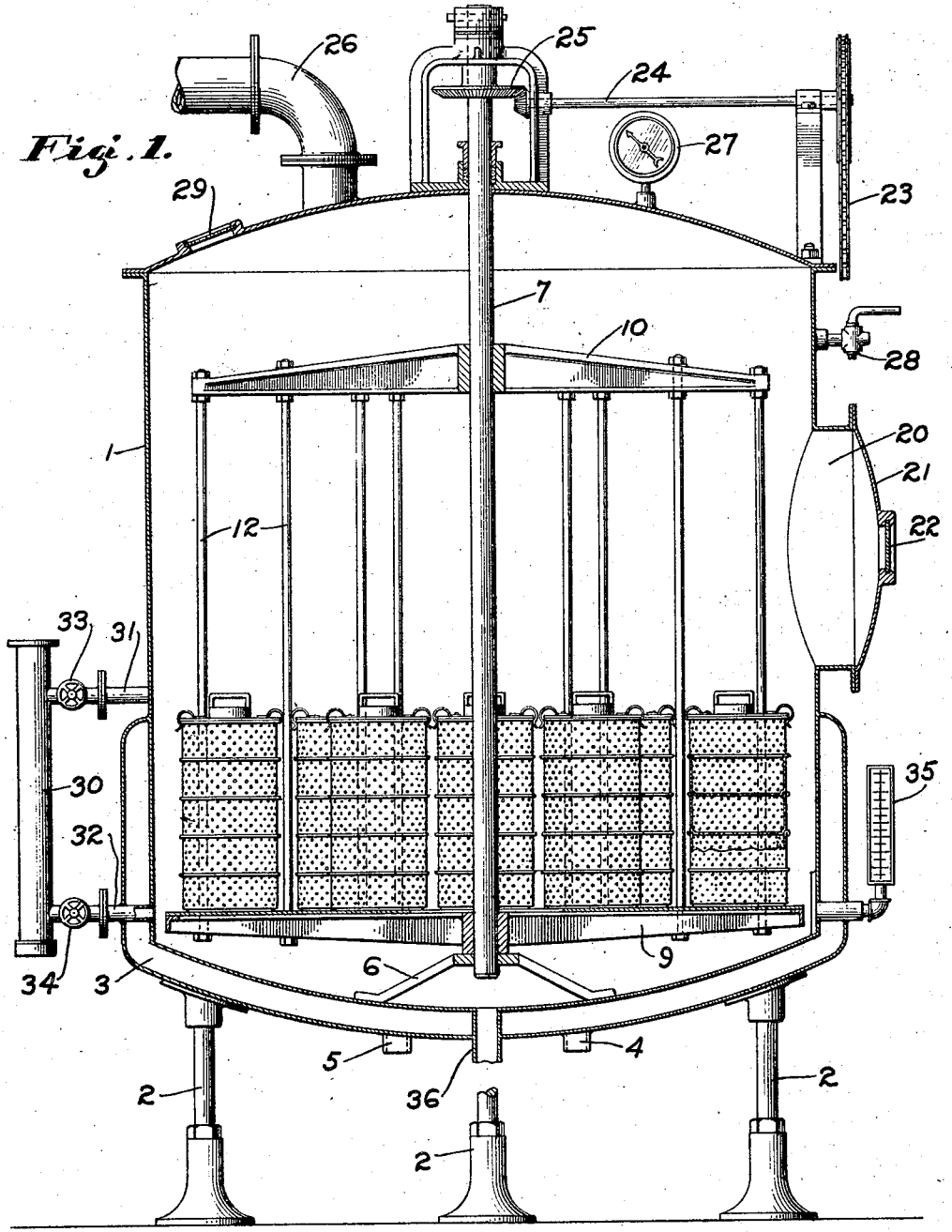
Fig. 1 is a sectional elevation through a vacuum kettle embodying my invention.
Figure 2:
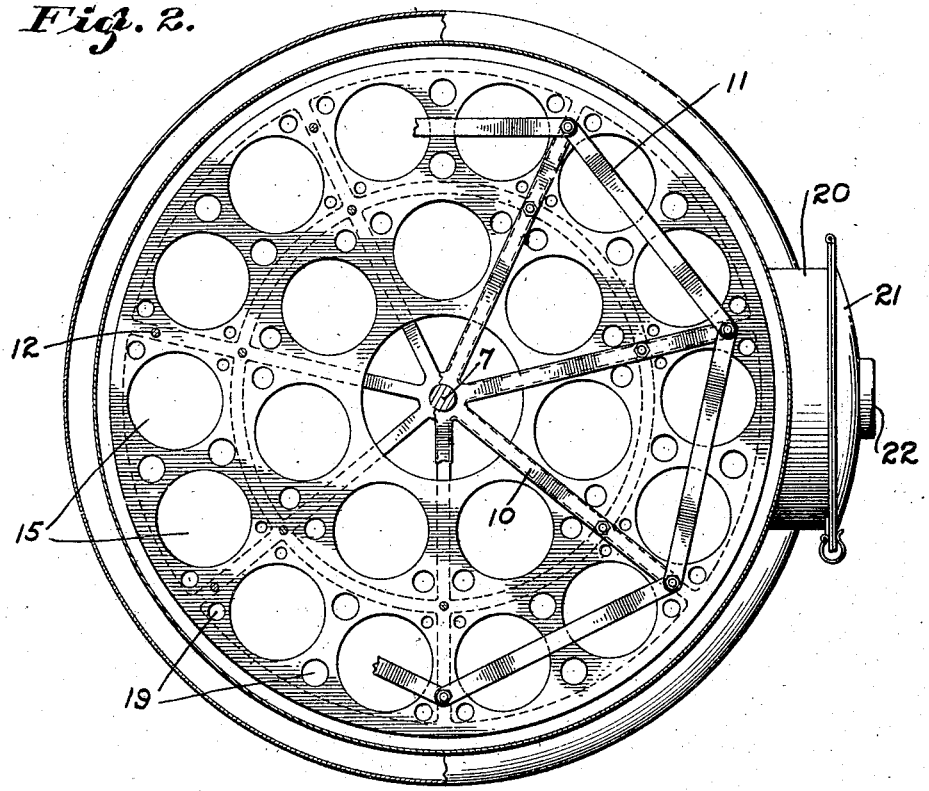
Fig. 2 is a plan sectional view thereof, the fruit containers being removed.

The apparatus as illustrated comprises a vacuum kettle 1 supported by upright elements 2. A heating jacket 3 surrounds the lower portion of the kettle, the jacket having an inlet 4 and an outlet 5. Mounted on a support 6 and extending vertically upward through the center of the kettle is a shaft 7. This shaft is provided with a supporting frame for carrying a plurality of fruit containers or pans 8.

Figure 3:
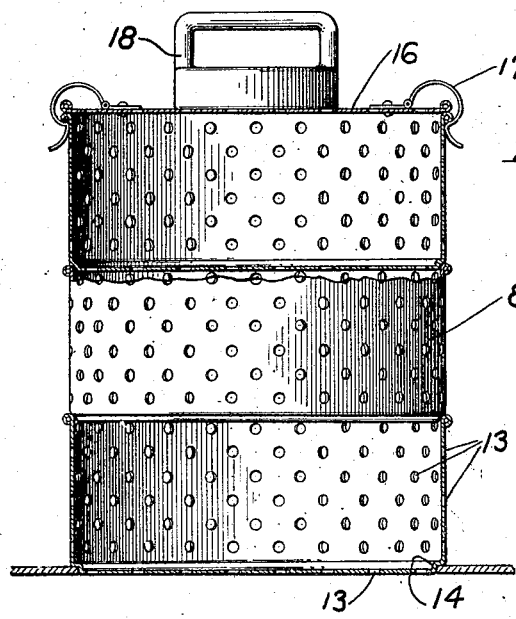
Fig. 3 is an enlarged elevation showing three of the stacked fruit containers.

This frame comprises a horizontal platform 9 resting on the support 6. An upper spider comprising a plurality of radial arms 10 connected by bars 11 is carried on the shaft above and connected to the platform by vertical rods 12. Each container 8 is a cylindrical pan having its bottom and sides perforated as at 13 and the bottom reduced in size at the edge 14. The platform is provided with a plurality of holes 15 therethrough of a size to receive the reduced pan bottoms therein as illustrated in Fig. 3. The pans are adapted to be stacked in the manner indicated, each pan bottom resting within an opening 15 or within the top of the supporting pan beneath. The top pan is provided with a perforated cover 16 having holding clamps 17 thereon and a weight 18 is also preferably placed thereon to assure holding the cover in place. The platform is also perforated with a plurality of holes 19.

A man-hole 20 is provided in the side of the kettle, the same being provided with an air-tight door 21 having a sight glass 22 therein. When inserting or removing the containers 8 through the man-hole, the platform 19 can be rotated to convenient positions therefor by a chain 23 connected to the shaft 7 through a shaft 24 and bevel gears 25.

The air is adapted to be exhausted from the kettle through a pipe 26, a gauge 27 being adapted to indicate the amount of such exhaustion. A valve is provided at 28 for permitting the entrance of air when it is desired to break the vacuum within the kettle. A sight glass 29 is also preferably placed in the top of the kettle.

A sampler for the syrup within the kettle is provided at 30, the sampler entering the kettle at 31 and 32 and having controlling valves 33 and 34. A thermometer 35 is adapted to indicate the temperature of the syrup. After the cooking operation, the syrup can be drawn from the kettle through a drain 36.

The process as carried out by this apparatus will now be described.

The fruit is prepared and blanched in the usual manner and then placed in the containers 8, the containers thereafter being arranged in stacked relation on the platform 9 within the kettle as illustrated. The kettle is closed and the fruit completely covered with cold syrup of 32° Baumé or 28° boiling. The fruit is permitted to thus stand for about one hour, the syrup being thereafter drawn off and the vacuum pump started, with no syrup in the kettle. The kettle is held under twenty inches of vacuum for five minutes to draw as much air from the fruit as possible. Sufficient of the syrup which was drawn therefrom is then allowed to enter the kettle to cover the pans and about twenty-five per cent excess. The temperature of the syrup is thereafter brought to 140° F. to 150° F. with a vacuum of twenty-five to twenty-six inches and held constant until cooking is completed (usually about four to five hours).

As the syrup concentrates and the level lowers in the kettle, the same is replaced by permitting syrup of the same density as that in the kettle at that time to enter through the opening 36. This density is determined by sampling the syrup through the sampler 30. As the syrup concentrates, the temperature will rise 10° F. to 15° F. During this rise the vacuum should be held constant. When the syrup has reached a density of 38° Baumé, the cooking is discontinued, the vacuum pump stopped, and the vacuum broken by opening the valve 28.

The syrup is then drawn from the kettle and when sufficiently cool the containers 8 are removed. The fruit is then placed in the usual storage pans, covered with the drained syrup and stored therein until needed for packing. During this time, equilibrium is established between the density of the thinner syrup within the fruit and the thicker syrup surrounding the same. Such equilibrium ordinarily takes place within about twenty-four hours and after this time the fruit can be removed, glazed, and packed.

It should be noted that my process as above described is particularly adapted for the cooking and treating of fruit in preparing glacé fruit therefrom. This process differs in many material respects from ordinary vacuum cooking. In ordinary vacuum cooking, the highest vacuum and lowest temperature obtainable is ordinarily used, and the concentration of the product is as rapid as possible, the main object being to have a very rapid concentration and low temperature. In my process, the use of vacuum is not merely to concentrate the syrup, but to prevent the esters or flavor bodies in the fruit from being broken down and destroyed. My process is not particularly concerned therefore with rapid concentration, but is more concerned with holding the fruit under a vacuum at high enough temperature to cause a free flow of constantly concentrating syrup through the fruit.

By my improved process, 1,500 to 2,000 pounds of fruit are ordinarily cooked with one batch, the cooking and syrup equalizing operations as above described ordinarily taking eight hours and twenty-four hours respectively as compared with the several weeks required in the process now known and used. The labor cost is very considerably reduced by the difference in temperature required, the amount of fruit handled in one batch, and the greatly reduced amount of manual handling required, as will be well understood. Furthermore, the flavor, color, and shape of the fruit is maintained by my improved process to a far greater degree than where the fruit is cooked in the open over a long period of time, and handled over many times during such cooking.

In cooking under vacuum, only the air cells of the fruit are affected; that is, the air is sucked from the fruit while the fruit juices remain in the fruit. This is due to the relative density of air and the fruit juices. Hence, it is seen that, due to this property, the fruit juices remain in the fruit and it is only the air spaces which are saturated with syrup. Thus, the vacuum-cooked fruit retains the natural flavor of the fruit by retaining these fruit juices.

It may furthermore be stated that the glacé fruit prepared by my improved process has far greater keeping qualities than that cooked by the old method. Fruit prepared by the old method becomes hard and unfit for consumption after about eight months, while fruit that has been prepared by my improved vacuum method has by actual test, after a period of fourteen months, retained its original tenderness and edible qualities. Judging from this test, it is believed that this fruit should remain in good condition over a period of years. This can not be done with fruit prepared by the old method as heretofore practiced.

Having thus described my invention, what I claim and desire to secure by Letters Patent is—

1. A process of preparing glacé fruit which comprises the steps of preparing the fruit, blanching the fruit in water to render it tender, permitting the fruit to remain submerged in cold syrup for a short period of time to remove the water therefrom and treat the fruit so that the cells will not become disrupted, then cooking the fruit in the syrup solution while under vacuum and in a manner saturating the fruit with the syrup, and thereafter permitting the fruit to stand in the solution until equilibrium takes place between the syrup in the fruit and the syrup surrounding the fruit.

2. A process of preparing glacé fruit which comprises the steps of preparing the fruit, blanching the fruit to render it tender, permitting the fruit to remain in cold syrup of a determined density for a short period of time to remove the water therefrom and treat the fruit so that the cells will not become disrupted, then removing the syrup and placing the fruit under vacuum to draw the air therefrom, then resubmerging the fruit in the syrup without breaking the vacuum, then cooking the fruit in the syrup under a constant vacuum until the syrup solution reaches a predetermined density, and thereafter permitting the fruit to stand in syrup solution until equilibrium takes place between the syrup in the fruit and the syrup surrounding the fruit.

3. A process of preparing glacé fruit which comprises the steps of blanching the fruit, permitting the fruit to remain submerged in cold syrup for a short period of time, then removing the syrup and subjecting the fruit to a vacuum of about twenty inches for five minutes, adding a sugar syrup solution to the fruit to surround the same, cooking the fruit in the sugar solution at a temperature of approximately 140° F. to 150° F. with a vacuum of approximately twenty-five inches until the cooking is completed, and thereafter permitting the fruit to stand in the syrup solution until equilibrium takes place between the syrup in the fruit and the syrup surrounding the fruit.

ERNEST ENGLER JACOBS.